(12) United States Patent
Konno

(10) Patent No.: US 9,948,908 B2
(45) Date of Patent: Apr. 17, 2018

(54) DISPLAY CONTROL DEVICE AND DISPLAY CONTROL METHOD

(71) Applicant: SONY CORPORATION, Tokyo (JP)

(72) Inventor: Georgero Konno, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 15/058,942

(22) Filed: Mar. 2, 2016

(65) Prior Publication Data

US 2016/0269702 A1  Sep. 15, 2016

Related U.S. Application Data

(60) Provisional application No. 62/130,343, filed on Mar. 9, 2015.

(51) Int. Cl.
| | |
|---|---|
| *H04N 9/31* | (2006.01) |
| *G03B 17/54* | (2006.01) |
| *G03B 21/62* | (2014.01) |
| *G03B 31/00* | (2006.01) |

(52) U.S. Cl.
CPC .......... *H04N 9/3182* (2013.01); *G03B 17/54* (2013.01); *G03B 21/62* (2013.01); *G03B 31/00* (2013.01); *H04N 9/3141* (2013.01); *H04N 9/3185* (2013.01)

(58) Field of Classification Search
CPC ....... G03B 17/54; G03B 21/62; H04N 9/3182
USPC ............... 348/744, 383, 745, 746, 806, 135; 353/79, 82
See application file for complete search history.

(56) References Cited

U.S. PATENT DOCUMENTS 7,980,704 B2 *   7/2011   Kondo .................. G03B 21/10
                                                        353/122
8,866,902 B2 *   10/2014  Furui ..................... G03B 21/14
                                                        348/135

FOREIGN PATENT DOCUMENTS

JP        2007-110674 A      4/2007

* cited by examiner

*Primary Examiner* — Paulos M Natnael
*Assistant Examiner* — Jean W Desir
(74) *Attorney, Agent, or Firm* — Oblon, McClelland, Maier & Neustadt, L.L.P.

(57) ABSTRACT

There is provided a display control device including a display control unit configured to perform control to display a second image based on image information on a surface of a projection device that projects a first image based on the image information onto a predetermined surface. The first image and the second image correspond to different ranges of a single image that is reproduced from the image information.

20 Claims, 21 Drawing Sheets

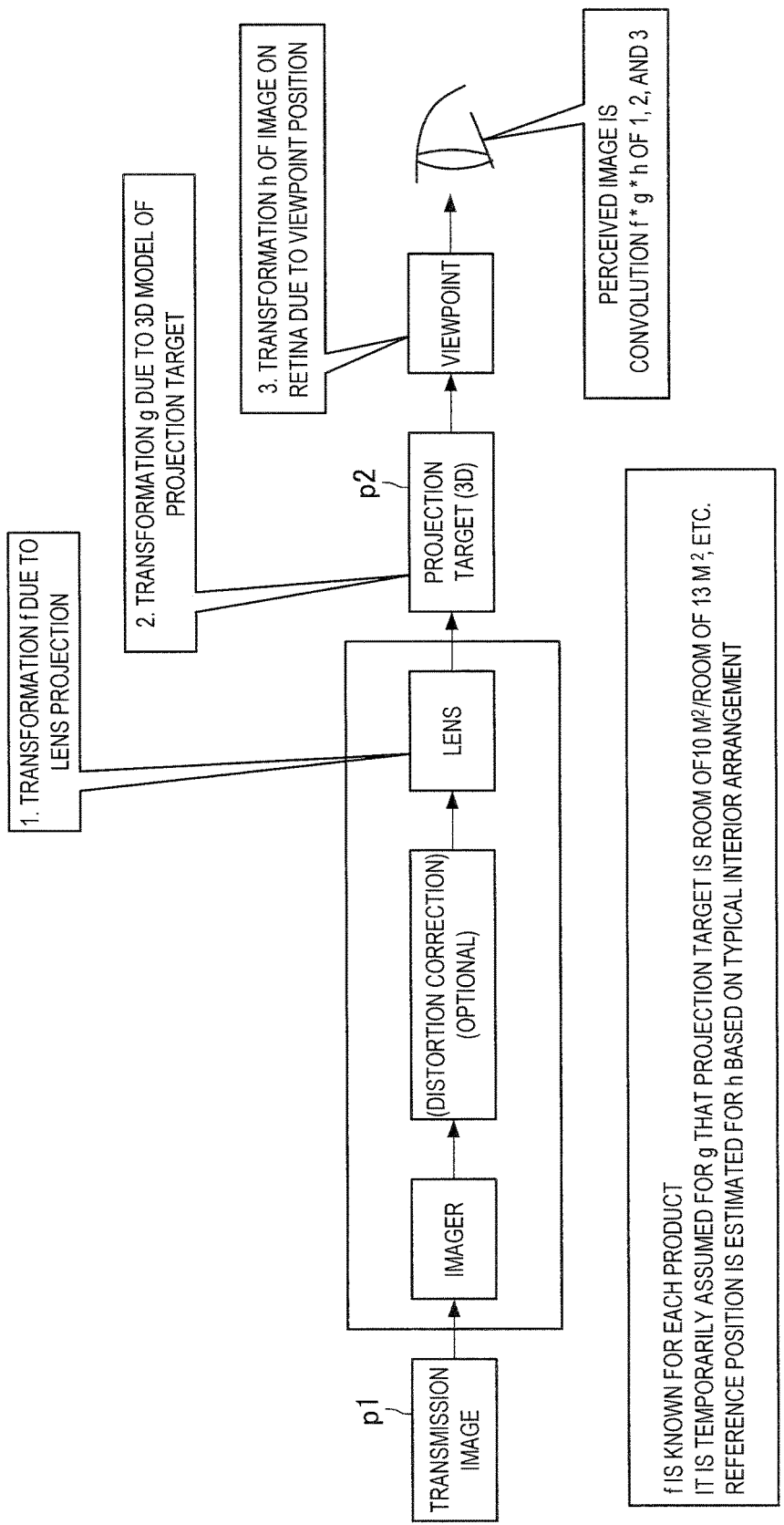

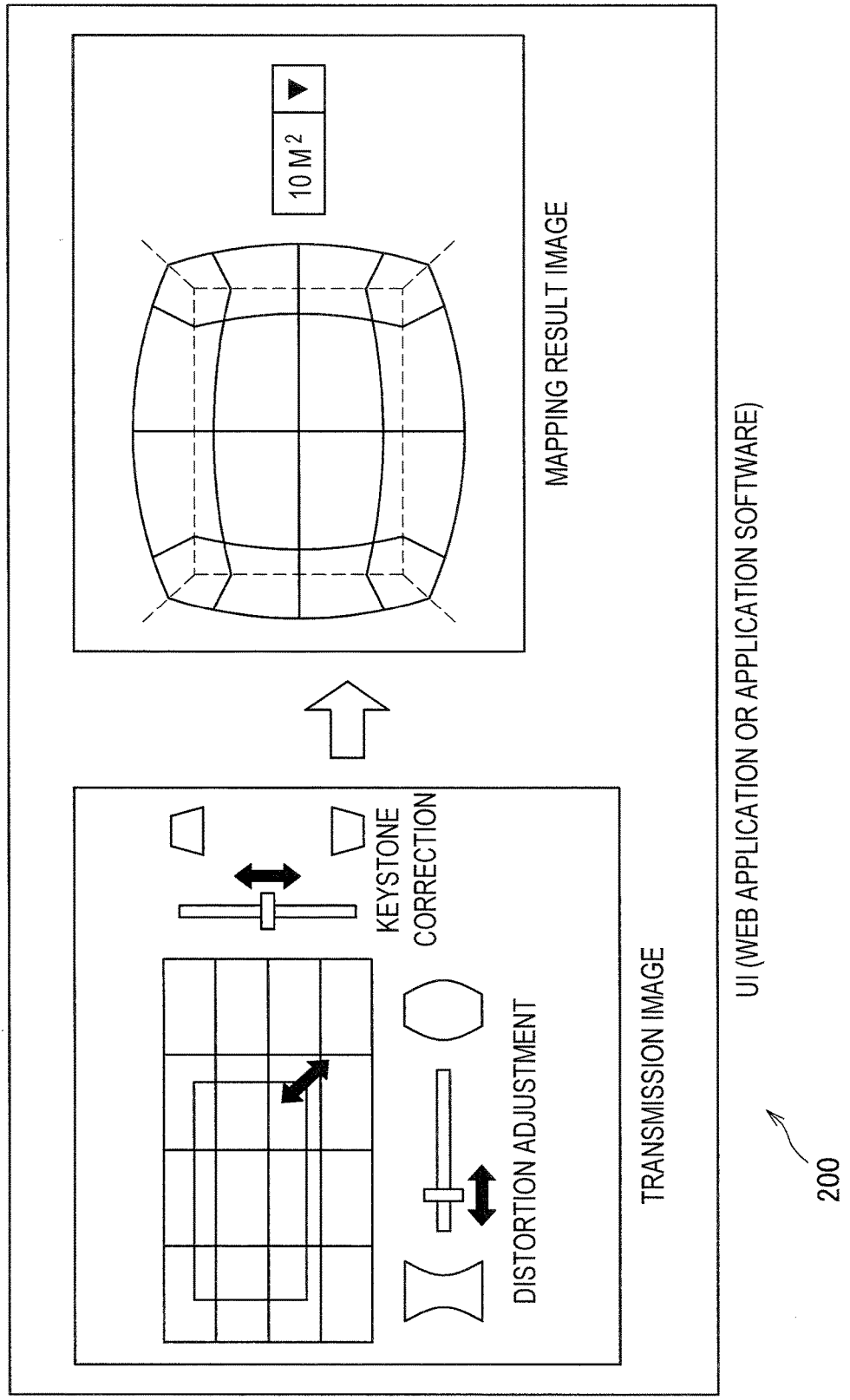

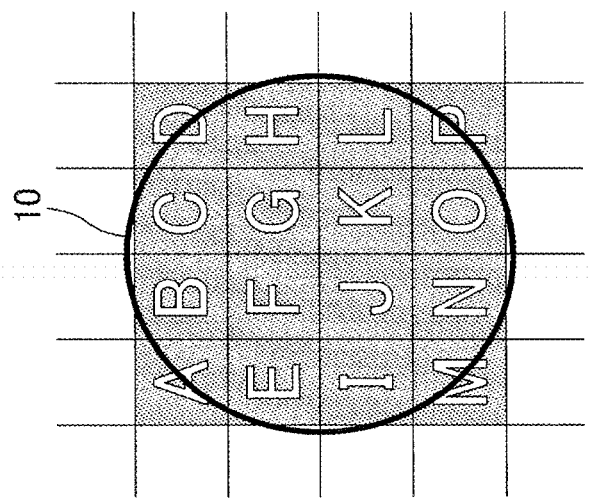
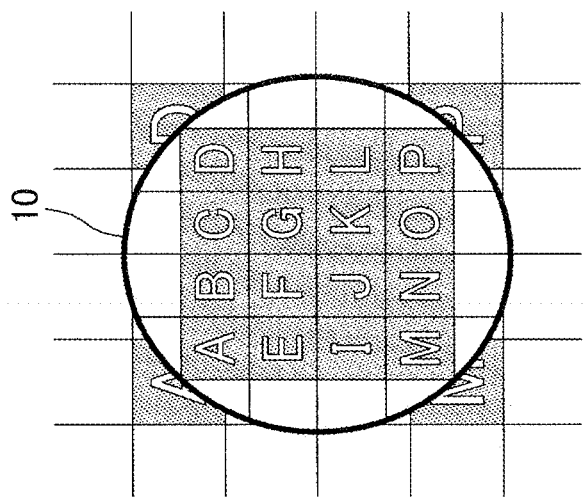
FIG.9

DISPLAY CONTROL DEVICE AND DISPLAY CONTROL METHOD

CROSS REFERENCE TO RELATED APPLICATIONS

This application claims the benefit of U.S. Provisional Application 62/130,343 filed Mar. 9, 2015, the entire contents of which are incorporated herein by reference.

BACKGROUND

The present disclosure relates to a display control device and a display control method.

The use of a light-integrated projector into which a lighting device that irradiates a room with light and a projector that is capable of projection onto the walls and the ceiling of the room are integrated makes it possible to project a still image or a picture onto not only the walls of the room, but also the ceiling of the room. The light-integrated projector can project a still image or a picture to the whole room by projecting the still image or the picture onto not only the walls of the room, but also the ceiling of the room.

SUMMARY

However, when a person in a room looks at a still image or a picture as projected on the ceiling by a projector hung from the ceiling, the projector itself hides a part of the ceiling, thereby causing the person to recognize the still image or picture projected by the projector as a partially missing still image or picture.

Thus, according to an embodiment of the present disclosure, there are provided novel and improved display control device and display control method that can allow a user to visually recognize a continuous image on the whole of a predetermined surface by displaying the image displayed on the predetermined surface on an object which obstructs the visual recognition of the image.

According to an embodiment of the present disclosure, there is provided a display control device including: a display control unit configured to identify an area of a first image the visual recognition of which from a predetermined position is obstructed by an object, the first image being to be projected onto a predetermined surface, and to generate a second image to be projected onto the object by dividing a part of the first image to allow for the visual recognition of the whole of the first image.

In addition, according to another embodiment of the present disclosure, there is provided a display control method including: identifying an area of a first image the visual recognition of which from a predetermined position is obstructed by an object, the first image being to be projected onto a predetermined surface, and generating a second image to be projected onto the object by dividing a part of the first image to allow for the visual recognition of the whole of the first image.

According to one or more of embodiments of the present disclosure as described above, it is possible to provide novel and improved display control device and display control method that can allow a user to visually recognize a continuous image on the whole of a predetermined surface by displaying the image displayed on the predetermined surface on an object which obstructs the visual recognition of the image.

BRIEF DESCRIPTION OF THE DRAWINGS

FIG. 6 is an explanatory diagram for describing a convolution of distortions of images concurrently projected onto a plurality of surfaces;

FIG. 7 is an explanatory diagram illustrating an example of a user interface 200 that allows a content creator to operate a distortion parameter;

FIG. 9 is an explanatory diagram illustrating examples of images to be projected onto a ceiling and a light shade 10;

DETAILED DESCRIPTION OF THE EMBODIMENT(S)

Figure 1:
FIG. 1 is an explanatory diagram illustrating that a projector is projecting a picture on a ceiling.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Now, a description will be made in the following order.
1. Embodiment of the Present Disclosure
   1.1. Overview
   1.2. Example of Configuration
2. Conclusion

1. Embodiment of the Present Disclosure

[1.1. Overview]

First of all, the overview of an embodiment of the present disclosure will be described. As discussed above, the use of a light-integrated projector capable of projection onto the ceiling makes it possible to project a still image or a picture onto not only the walls of a room, but also the ceiling of the room, thereby projecting the still image or the picture onto the whole room.

However, if the projector projects a picture onto the ceiling, the projector itself hides a part of the ceiling from a person in the room, causing the still image or the picture to be viewed as a partially missing still image or picture.

FIG. 1 is an explanatory diagram illustrating that the projector is projecting a picture on a ceiling. While the projector is projecting a still image or a picture onto the ceiling, no still image or picture is displayed on the projector itself. The projector itself thus hides a part of the ceiling from a person in the room, causing the still image or the picture to be viewed as a partially missing still image or picture.

The present discloser has then intensively studied the technology of preventing a projector itself from hiding a part of the ceiling from a person in a room while the projector is projecting a still image or a picture onto the ceiling. As a result, the present discloser has devised a technique of appropriately displaying a still image or a picture also on a projector itself, thereby preventing the projector itself from hiding a part of the ceiling from a person in a room while the projector is projecting a still image or a picture on the ceiling.

Figure 2:
FIG. 2 is an explanatory diagram illustrating that a projector is projecting a picture on a ceiling.

FIG. 2 is an explanatory diagram illustrating that the projector is projecting a picture on the ceiling. Different from FIG. 1, FIG. 2 illustrates that a picture is projected also on the body of the projector. Projecting a picture onto not only the ceiling, but also the body of the projector makes it possible to show the picture without allowing the projector itself to hide a part of the ceiling from a person in the room who is viewing the picture.

However, it is not sufficient to simply project a still image or a picture also onto the body of the projector, but it is necessary to allow a person in the room to visually recognize that a still image or a picture projected on the ceiling is integrated with the still image or picture projected on the body of the projector.

The projector according to the present embodiment is thus characterized in that the projector decides an area of an image to be projected onto the ceiling which is hidden by the body of the projector from a person who is viewing the image, divides the image into images for the ceiling and the body of the projector, and outputs the divided images.

[1.2. Example of Configuration]

Figure 3:
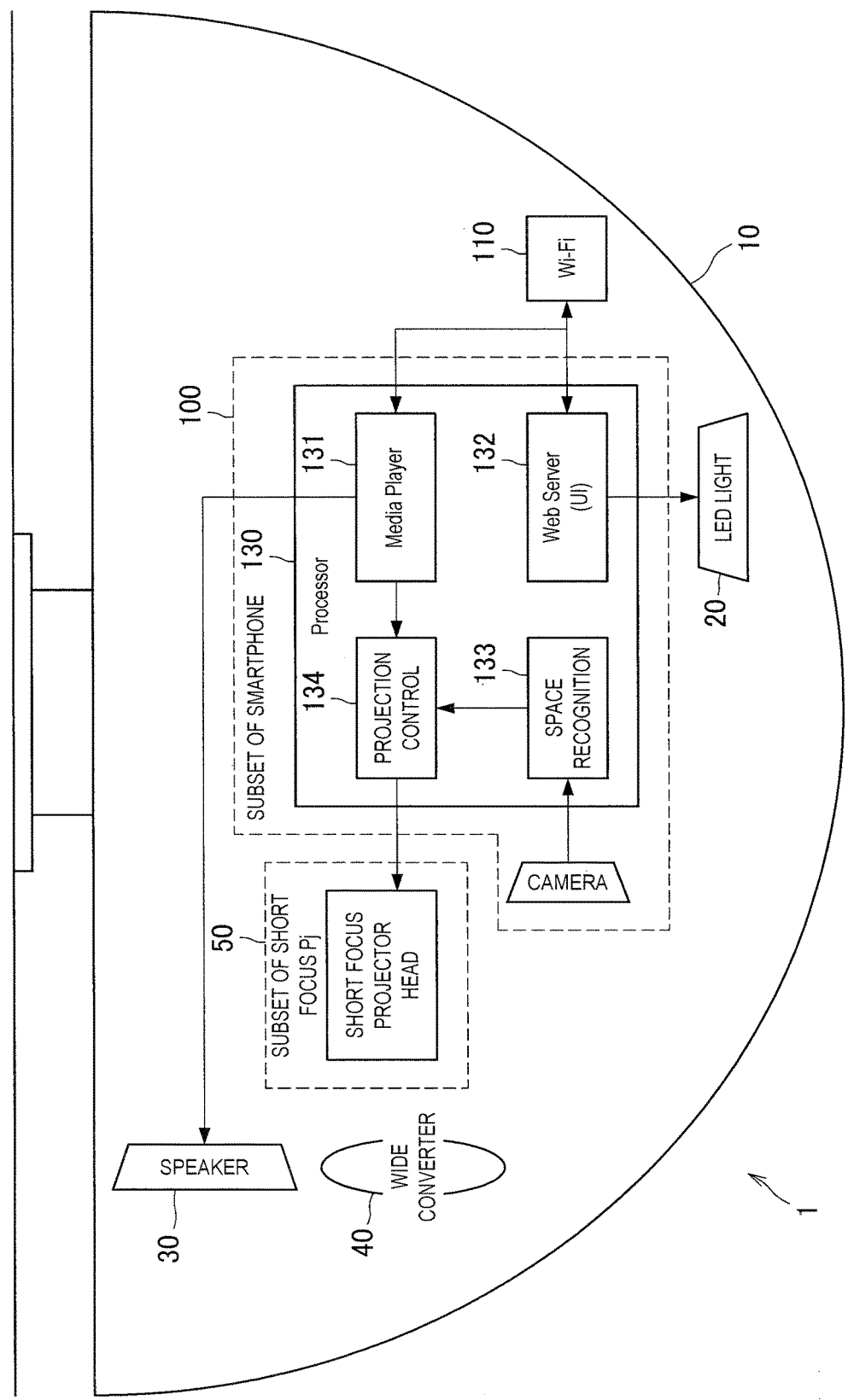
FIG. 3 is an explanatory diagram illustrating an example of a configuration of a light-integrated projector 1 according to an embodiment of the present disclosure.

FIG. 3 is an explanatory diagram illustrating an example of the configuration of a light-integrated projector 1 according to an embodiment of the present disclosure. As illustrated in FIG. 3, the light-integrated projector 1 according to an embodiment of the present disclosure includes an LED light 20, a speaker 30, a short focus projector head 50 equipped with a wide converter 40, and a control device 100 inside a light shade 10.

The LED light 20 is, for example, controlled by the control device 100 to irradiate a room with light. The speaker 30 is controlled by the control device 100 to output sounds. The sounds output from the speaker 30 may work with a still image or a picture output from the short focus projector head 50.

The short focus projector head 50 is controlled by the control device 100 to output a still image or a picture. The front of the short focus projector head 50 is equipped with the wide converter 40 for widening the angle of field. The short focus projector head 50 equipped with the wide converter 40 can project a still image or a picture onto the whole of the walls or the ceiling of a room.

It is possible to install a plurality of short focus projector heads 50. In other words, there are installed a short focus projector head 50 for projecting a still image or a picture onto the whole of the walls or the ceiling of a room, and a short focus projector head 50 for projecting a still image or a picture onto the light shade 10.

The control device 100 controls a still image, a picture, a sound, or light output from the light-integrated projector 1. The control device 100 includes a Wi-Fi communication unit 110, a camera 120, and a processor 130.

The Wi-Fi communication unit 110 establishes information communication via a wireless LAN. The camera 120 images areas around the light-integrated projector 1. For example, the camera 120 images an area in the direction corresponding to the ceiling side of the light-integrated projector 1, and the inside of the room in which the light-integrated projector 1 is placed. The processor 130 controls the operation of the control device 100.

The processor 130 includes, for example, a central processing unit (CPU). For example, loading programs causes the processor 130 to function in a manner that the processor 130 includes a media player 131, a web server 132, a space recognition unit 133, and a projection control unit 134.

The media player 131 reproduces, for example, still image content or picture content acquired by the Wi-Fi communication unit 110. The media player 131 operates, for example, to output sounds in the picture content from the speaker 30, and to output images in the picture content from the short focus projector head 50 via the projection control unit 134.

The web server 132 provides a user interface through a web application. Examples of the user interface provided from the web server 132 may include user interfaces for performing control to turn on and off the LED light 20, and adjusting an image output from the short focus projector head 50.

The space recognition unit 133 recognizes the space around the light-integrated projector 1 with images of the areas around the light-integrated projector 1 that are captured by the camera 120. The space recognition unit 133 measures the reflectance of the ceiling, for example, with the images captured by the camera 120.

The projection control unit 134 is an example of a display control unit according to an embodiment of the present disclosure. The projection control unit 134 decides an area of a picture to be projected onto the ceiling from still image content or picture content to be reproduced by the media player 131, the area being hidden by the body of the projector from a person who is viewing the still image or the picture, and divides the still image or the picture into still images or pictures for the ceiling and the body (light shade 10) of the projector, and outputs the divided still images or pictures to the short focus projector head 50.

When the projection control unit 134 outputs the still images or pictures divided for the ceiling and the body (light shade 10) of the light-integrated projector 1 to the short focus projector head 50, the projection control unit 134 creates a projection for the light shade 10 in a manner that a projection for the ceiling and the projection for the light shade 10 look continuous as seen from below. The projection control unit 134 makes a cutout from the original still image or picture and positions the cutout to create the projection for the light shade 10.

The projection control unit 134 may adjust an image to be projected onto the ceiling or an image to be projected onto the body of the light-integrated projector 1 to make the states of the image to be projected onto ceiling agree with the states of the image to be projected onto the body of the light-integrated projector 1. For example, the projection control unit 134 may adjust the image to be projected onto the ceiling or the image to be projected onto the body of the light-integrated projector 1 in a manner that one of the images has at least any of luminance, color, and color temperature identical with that of the other as a state that agrees with that of the other. For example, the projection control unit 134 may measure the reflectance of the ceiling with the camera 120, and adjust the luminance, the color, or the color temperature of a projection onto the light shade 10 on the basis of the color tone or the transmittance of the light shade 10.

The control device 100 may be incorporated into the light-integrated projector 1, or may be separate from the light-integrated projector 1. The function of the control device 100 may be incorporated into a device such as a smartphone, a tablet terminal, and a personal computer.

In other words, the light-integrated projector 1 according to an embodiment of the present disclosure includes the plurality of short focus projector heads 50 and the projection control unit 134 that generates projection images for the respective short focus projector heads 50. The short focus projector heads 50 each include at least a short focus projector head that serves to project an image onto a predetermined surface such as a wall and the ceiling, and a short focus projector head that serves to project an image onto an object such as the light shade 10 which prevents the image on a predetermined surface from being visually recognized from a predetermined position.

Figure 4:
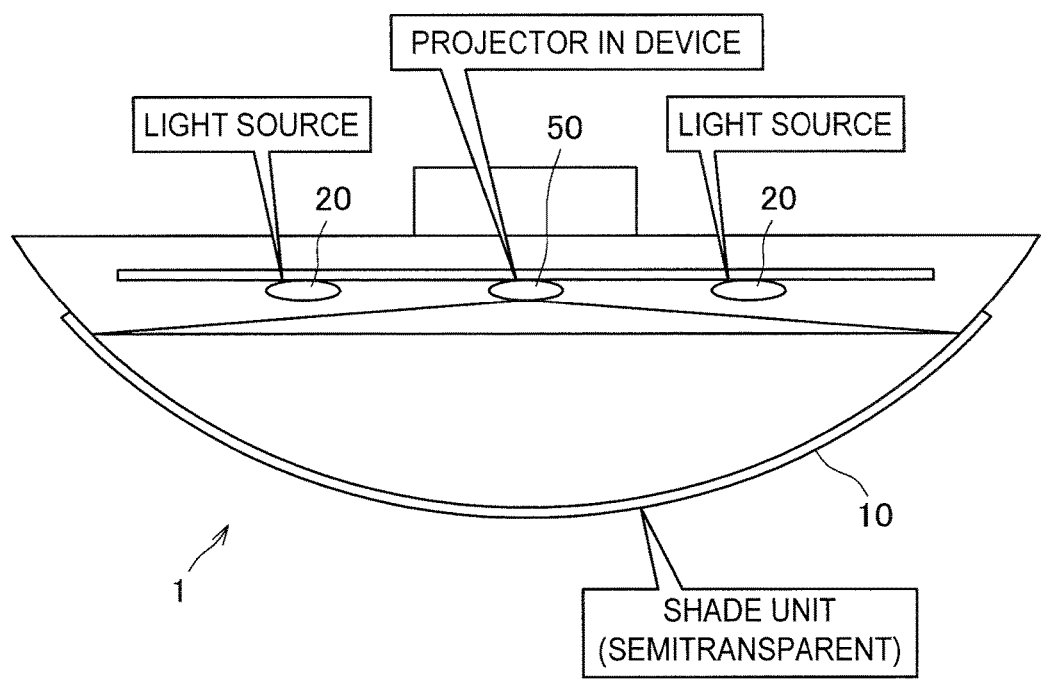
FIG. 4 is an explanatory diagram illustrating an example of an internal structure of the light-integrated projector 1 according to the embodiment.

FIG. 4 is an explanatory diagram illustrating an example of the internal structure of the light-integrated projector 1 according to an embodiment of the present disclosure. The light-integrated projector 1 includes the LED lights 20 and the short focus projector head 50 inside the semitransparent light shade 10.

The short focus projector head 50 is installed to project a still image or a picture onto the light shade 10. An area of the still image or the picture to be projected onto the light shade 10 is appropriately decided under the control of the projection control unit 134. This allows a man looking up at the still image or the picture on the ceiling to visually recognize the projections on the ceiling and the light shade 10 as a continuous still image or picture without any seam made by the light-integrated projector 1.

The use of this light-integrated projector 1 makes it possible to provide an indoor projector that is capable of concurrent projection onto a plurality of surfaces and uses a wide-angle lens, and a network system that creates and distributes content to the projector capable of projection onto a plurality of surfaces.

It is also possible to provide a projector that includes a wide-angle lens such as a fish-eye lens and is capable of concurrent projection onto a plurality of surfaces such as the ceiling in addition to three walls as the indoor projector.

It is also possible to provide a projector that includes a distortion correction unit configured to eliminate even a distortion caused by a mounted fish-eye lens, and is capable of concurrent projection onto a plurality of surfaces.

It is also possible to provide a projector capable of concurrent projection onto a plurality of surfaces which can recognize space with a camera mounted on a projector unit, and separately paint (make separate projections) a plurality of walls and the ceiling with a plurality of image sources.

It is also possible to provide a projector capable of concurrent projection onto a plurality of surfaces which can cancel a change in luminous flux density (change in luminance) due to a change in the distance between the projector and the projection surface to keep the luminance constant by photographing a result of projection of the projector with a camera mounted on a projector unit and feeding the result back.

It is also possible to provide a content creation system that creates and distributes content whose various distortions have been corrected in accordance with the intention of a content creator to a projector that includes the above-described projector and is capable of concurrent projection onto a plurality of surfaces.

It is also possible to provide a network system in the above-described content creation system, the network system having distortion correction processing implemented on a cloud server, and allowing the content creator to set a distortion correction parameter with only a PC or a tablet terminal in which a web browser operates.

It is also possible to provide a content creation user interface that can have the typical shape (such as a room of 10 m² and a room of 13 m²) of a projection target room preset in advance, and correct a distortion.

It is also possible to provide an image distribution system that automatically performs distortion correction processing appropriate for an image uploaded on the basis of the typical shape of a projection target room, the typical placement position of a projector, and a typical viewing position, and distributes the processed image.

Projection onto a plurality of surfaces from a single projector causes distortions and uneven luminance, degrading the quality of an experience of a viewer. A viewer has to perform transformation processing a projection target image for each room in accordance with the shape of a projection target, which makes the viewer make troublesome preparations before viewing. A high-speed and high-performance PC has to be used to perform transformation processing of correcting a distortion.

Figure 5A:
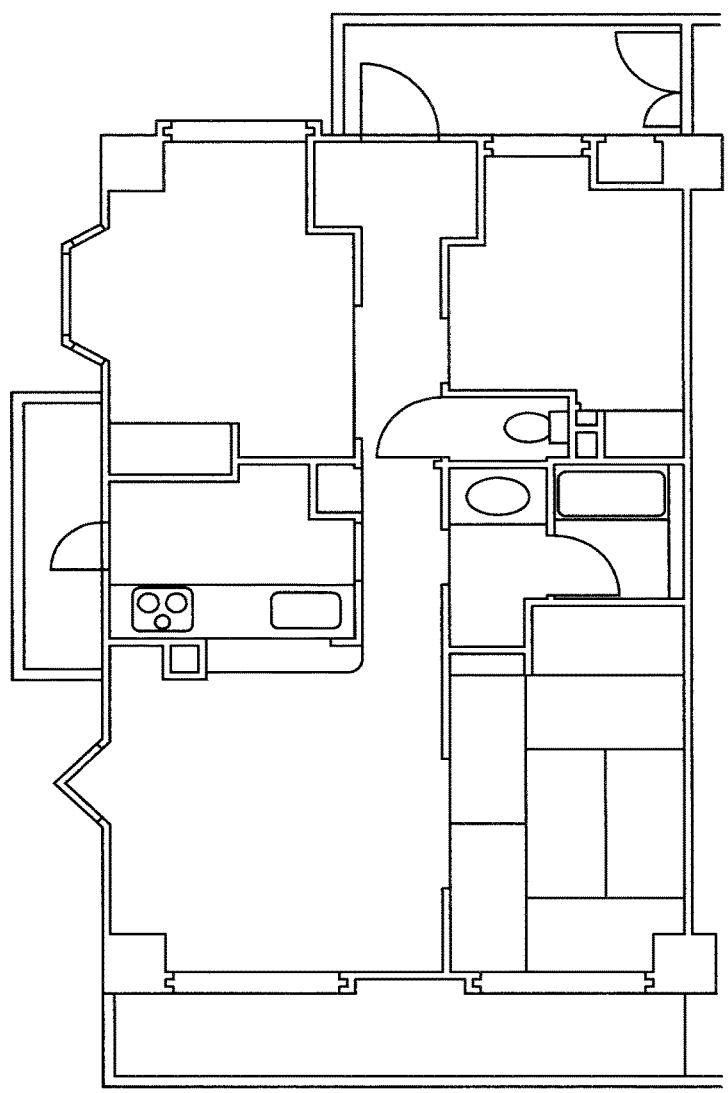
FIG. 5A is an explanatory diagram illustrating a floor plan of a typical apartment.
Figure 5B:
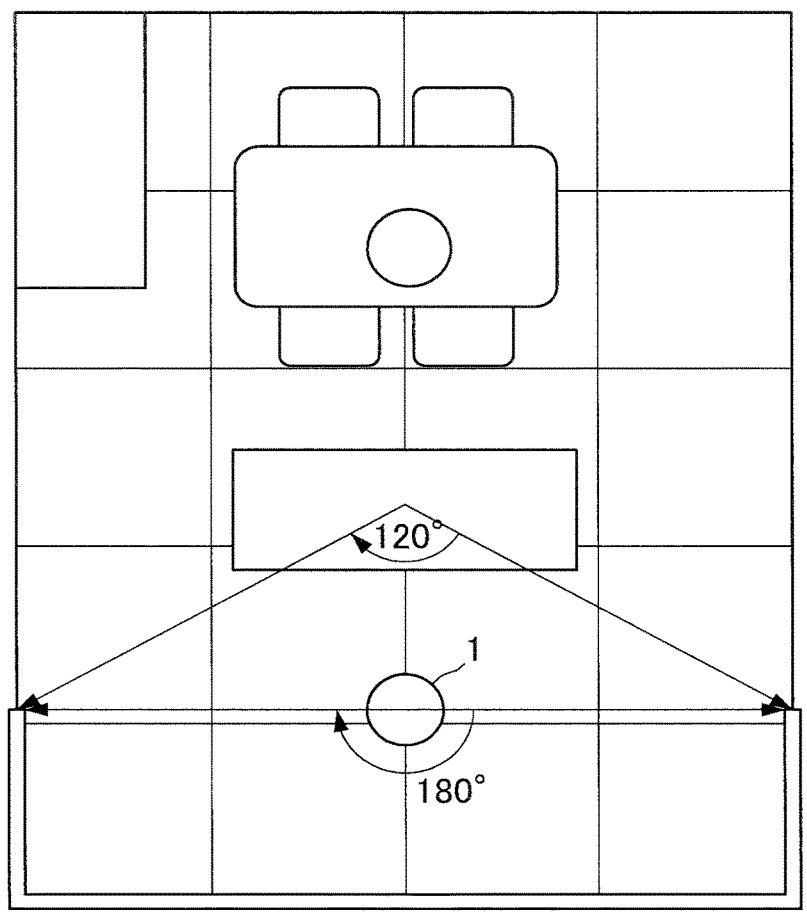
FIG. 5B is an explanatory diagram illustrating that the light-integrated projector 1 is placed in a living room, and projects a picture onto three walls.

FIG. 5A is an explanatory diagram illustrating the floor plan of a typical apartment. FIG. 5B is an explanatory diagram illustrating that the light-integrated projector 1 is placed in the living room, and projects a still image or a picture onto three walls.

If a still image or a picture is projected onto three walls and a 120-degree field of view is secured from the center of a living room, the use of a wide-angle lens for projecting the still image or the picture causes distortions and uneven luminance. The light-integrated projector 1 according to the present embodiment then provides processing that corresponds to the deconvolution of these convoluted distortions.

FIG. 6 is an explanatory diagram for describing the convolution of distortions of images concurrently projected onto a plurality of surfaces. As illustrated in FIG. 6, a distortion f due to a lens, a distortion g due to the shape of a projection surface, and a distortion h due to a viewpoint position are superimposed in concurrent projection onto a plurality of surfaces. In other words, an image perceived by a man has the three distortions f, g, and h convoluted therein.

The present embodiment provides a user interface a content creator, the user interface allowing the content creator to operate various distortion parameters seeing a result of the distortion processing (image showing a result of mapping to a room). FIG. 7 is an explanatory diagram illustrating an example of a user interface 200 that allows a content creator to operate a distortion parameter. The user interface 200 as illustrated in FIG. 7 may be provided as a web application or application software.

A cloud server that has received various distortion correction parameters specified by a content creator and the original image executes distortion correction processing on the basis of the distortion correction parameters, and then distributes, as a result of the distortion correction processing, the image that has undergone the distortion correction processing in the present embodiment. The distribution of the image that has undergone the distortion correction processing from the cloud server enables projection mapping to the inside of a room as intended by the content creator.

Figure 8:
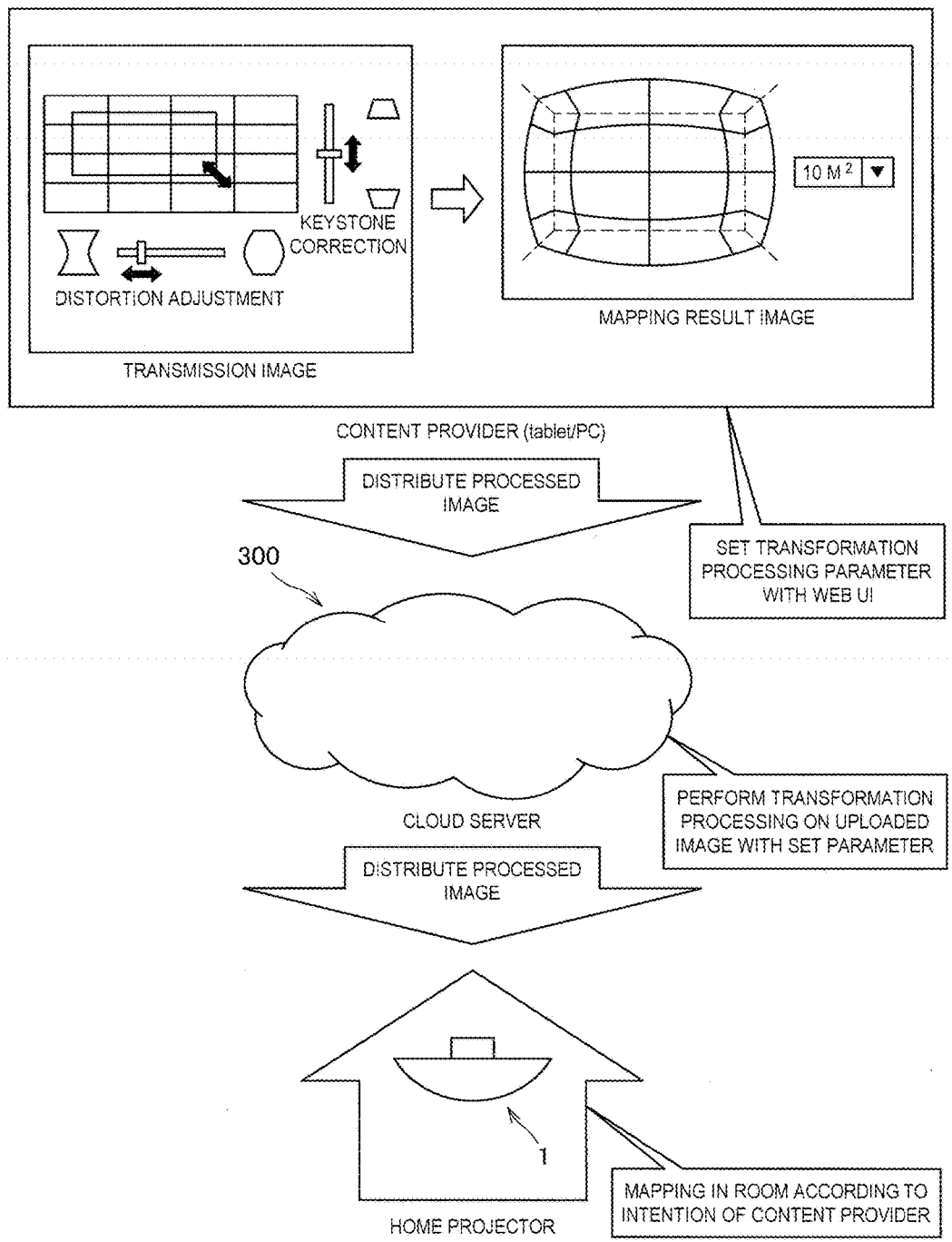
FIG. 8 is an explanatory diagram for describing distortion correction processing performed by a cloud server 300.

FIG. 8 is an explanatory diagram for describing distortion correction processing performed by a cloud server 300. A content creator specifies various distortion correction parameters with the user interface 200 as illustrated in FIG. 7 in the present embodiment. The cloud server 300 that has received the distortion correction parameters and the original image executes distortion correction processing on the original image on the basis of the distortion correction parameters, and then distributes an image resulting from the distortion correction processing. The distribution of the image resulting from the distortion correction processing from the cloud server 300 enables projection mapping to the inside of a room as intended by the content creator.

Needless to say, the distortion correction processing may be performed in not the cloud server 300, but a PC of the content creator or the projector close to a viewer.

The projection of still images or pictures onto a plurality of surfaces from a wide-angle projector in the related art causes distortions and uneven luminance in the still images or the pictures. The present embodiment provides a user interface that allows a content creator to specify distortion correction parameters, thereby canceling distortions and uneven luminance.

In addition, the present embodiment provides a user interface that allows a content creator to operate various distortion correction parameters seeing an image of a result of mapping to a room, thereby enabling proper projection mapping such as the projection of a picture of sea onto walls and the projection of a picture of sky onto the ceiling.

A content creator sets transformation parameters according to a projection place in advance in the present embodiment, and thus it is possible to spare a viewer the trouble when a still image or a picture is viewed. If the cloud server 300 performs actual distortion correction processing, a content creator can adjust distortion correction parameters with a device such as a notebook PC, a tablet terminal, and a smartphone even without a high-performance PC.

As discussed above, the projection control unit 134 decides an area (occlusion area) that is hidden by the body of the light-integrated projector 1 from a person who is viewing an image projected by the projector, divides the still image or the picture into a still image or a picture for the ceiling and the body (light shade 10) of the projector, and outputs the divided still images or pictures to the short focus projector head 50. The projection control unit 134 may reduce the original image to enhance the visual recognizability of the image to be projected onto the light shade 10 when creating a projection for the light shade 10. FIG. 9 is an explanatory diagram illustrating examples of images to be projected onto the ceiling and the light shade 10. FIG. 9 also illustrates the ceiling as seen from below.

For example, if letter information is displayed on an occlusion area of the light-integrated projector 1, the projection control unit 134 may generates an image to be projected onto the light shade 10 as illustrated in FIG. 9 to prevent letters from being displayed on the border between the ceiling and the light shade 10. In other words, the projection control unit 134 may generate an image to be projected onto the light shade 10 by reducing an image present on an occlusion area of the light-integrated projector 1 to prevent the letters from being positioned on the border between the ceiling and the light shade 10.

Some moving image content to be projected does not have to be displayed reduced, focusing on its continuity. For example, when there is no letter information, or when there is letter information, but the letter information is not displayed on an occlusion area of the light-integrated projector 1, the projection control unit 134 does not have to reduce an image present on the occlusion area of the light-integrated projector 1.

The projection control unit 134 may determine whether or not an occlusion area of the light-integrated projector 1 includes letter information, for example, on the basis of the content of metadata attached to moving image content, through the analysis of the content of the moving image content, or by another method. For example, when information is attached indicating that the moving image content includes a painting or a picture of a landscape as metadata, the projection control unit 134 does not have to reduce an image present on an occlusion area of the light-integrated projector 1.

In addition, a content creator may use the above-described content creation system to create content in a manner that letter information or other important information is not displayed on an occlusion area of the light-integrated projector 1.

Figure 10:
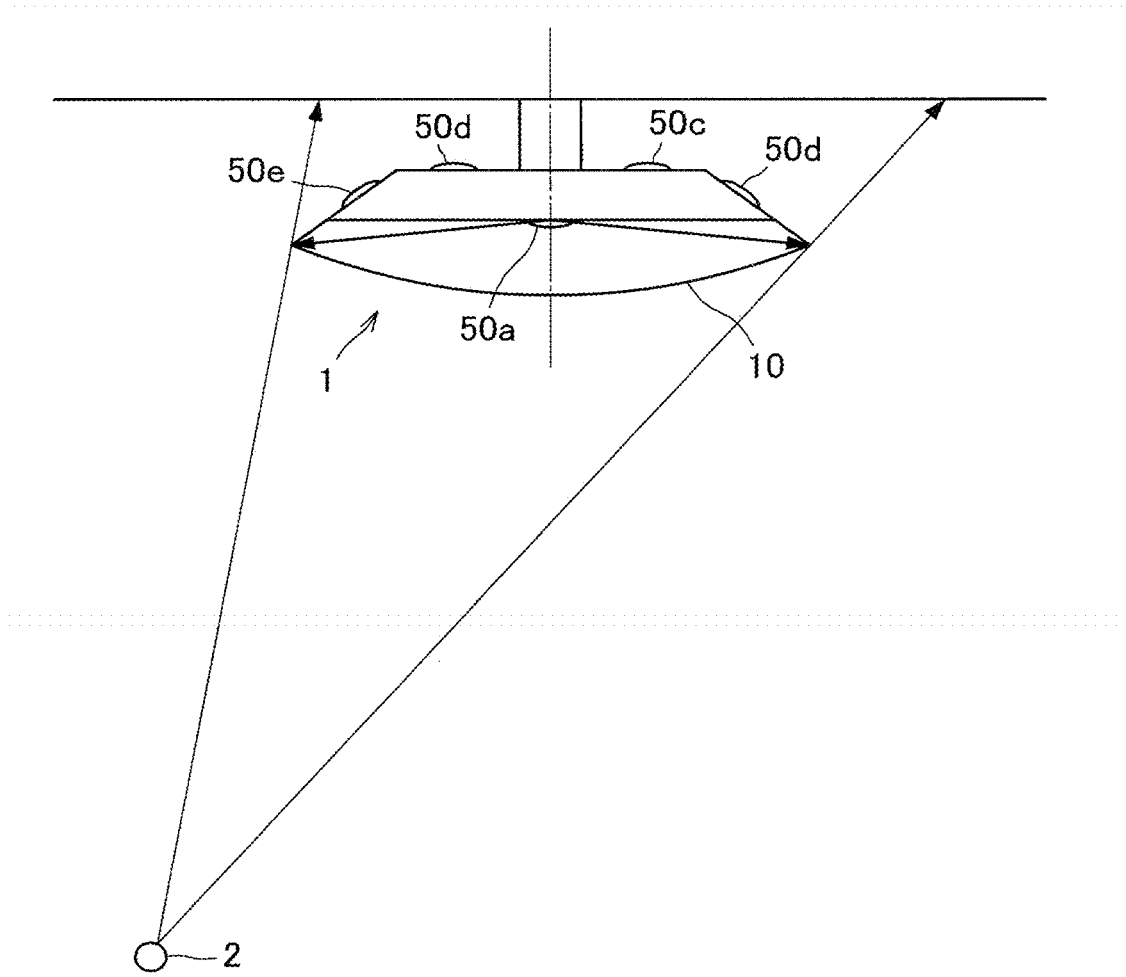
FIG. 10 is an explanatory diagram illustrating an example of a positional relationship.

FIG. 10 is an explanatory diagram illustrating examples of a viewpoint position 2 of a man who is viewing a still image or a picture projected by the light-integrated projector 1, and a positional relationship between the light-integrated projector 1 and the ceiling. FIG. 10 illustrates an example in which there are installed a projector head 50*a* that projects a still image or a picture onto the light shade 10, and projector heads 50*b* to 50*e* that each project a still image or a picture onto the ceiling on the light-integrated projector 1.

If the light shade 10 is shaped to obtain the widest outside diameter of a projection from the projector head 50, and to taper the attachment part to the lighting device, the projection alone can be seen from the viewpoint position 2 below the lighting device. The edges of the light causes the invisibility on the border between the ceiling and the light shade 10, but shaping the light shade 10 as discussed above eliminates the edges of the lighting device, onto which nothing can be projected, and makes it possible to secure the visibility on the border area from the viewpoint position 2 below the lighting device.

Next, processing of the projection control unit 134 to create a projection for the light shade 10 will be described in detail.

(1) Simple Positioning (Image Adjustment for Light Shade 10)

First processing is a method of identifying an occlusion area of the light-integrated projector 1 for a depicted image on the ceiling on the basis of the known distance between the light shade 10 and the ceiling, the known light distribution of the light-integrated projector 1, and the known shape of the light-integrated projector 1, and then mapping the identified occlusion area to the surface (i.e. light shade 10) of the light-integrated projector 1.

The processing of the projection control unit 134 to create a projection for the light shade 10 through the simple positioning in (1) will be described in more detail.

Figure 11:
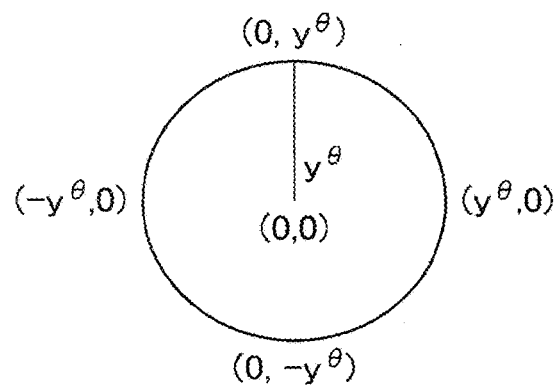
FIG. 11 is an explanatory diagram for describing an example in which a projection is created for the light shade 10.
Figure 12:
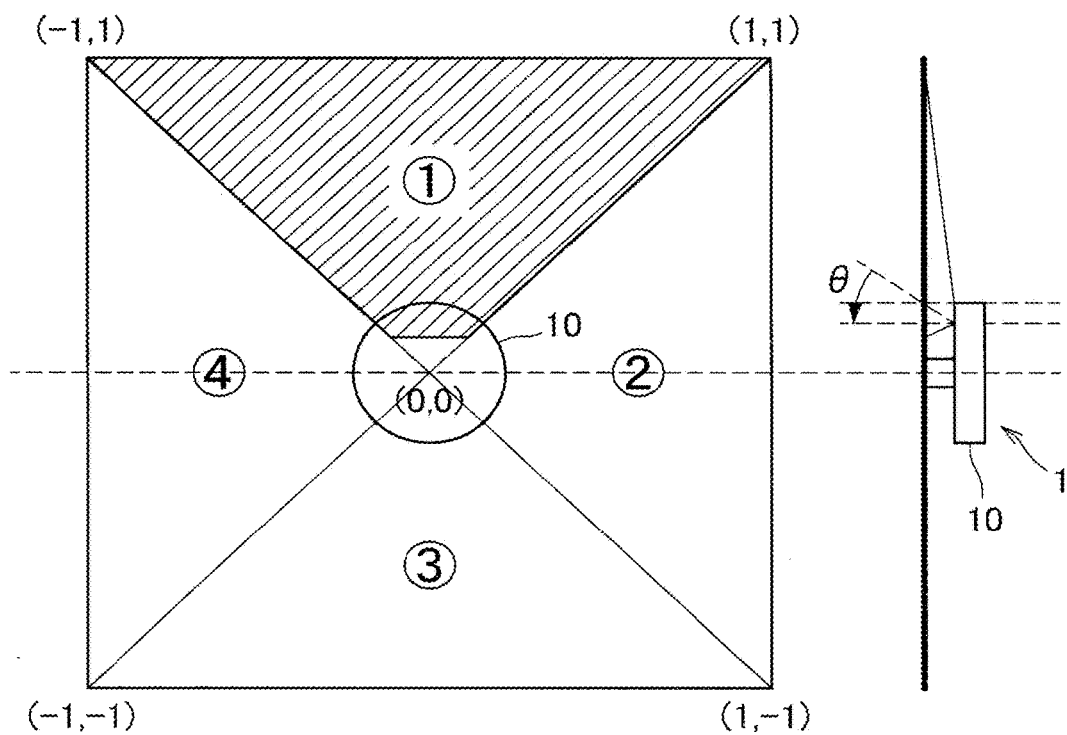
FIG. 12 is an explanatory diagram for describing an example in which a projection is created for the light shade 10.

FIGS. 11 and 12 are each an explanatory diagram for describing an example in which the projection control unit 134 creates a projection for the light shade 10 through the simple positioning. FIG. 11 illustrates a range of an image to be projected by the projector head 50*a* onto the surface of the light shade 10, while FIG. 12 illustrates a range of an image to be projected by each of the projector heads 50*b* to 50*e* onto the whole of the ceiling.

The range of the image to be projected onto the whole of the ceiling is normalized by using the center of the light shade 10 as the origin as illustrated in FIG. 12. The position of an image that forms an angle θ to the lens axis of the projector head as illustrated in FIG. 12 as a result of a combination of projection onto the ceiling through the lens of the projector head, the correction of distortions, and keystone correction is represented as (θ, $y^θ$).

It is possible to identify y by computing processing or actual measurement. If y is obtained through computing processing, pixels on a liquid crystal panel and an image on the ceiling are formed as a convolution of a lens projection transfer function f, a distortion correction transfer function g, and a keystone transfer function h. The projection control unit 134 obtains y through the deconvolution of f×g×h to the specified position on the ceiling. The projection control unit 134 generates an image for mapping an image having a radius of $y^θ$ to the light shade 10.

The projection control unit 134 thus generates an image having a radius of $y^θ$ which is mapped to the light shade 10. The projection control unit 134 generates an image having a radius of $y^θ$ which is mapped to the light shade 10, and then projects the generated image onto the light shade 10, thereby allowing the image to look continuous over the ceiling and the light shade 10 to a user who is looking up at the ceiling.

Figure 13:
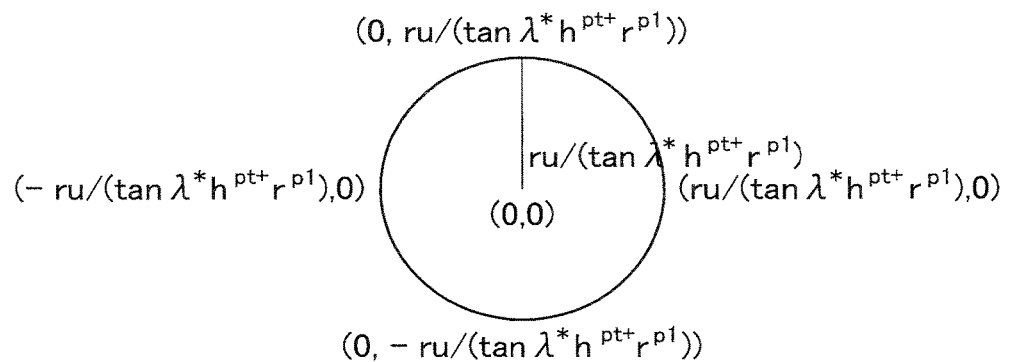
FIG. 13 is an explanatory diagram for describing an example in which a projection is created for the light shade 10.
Figure 14:
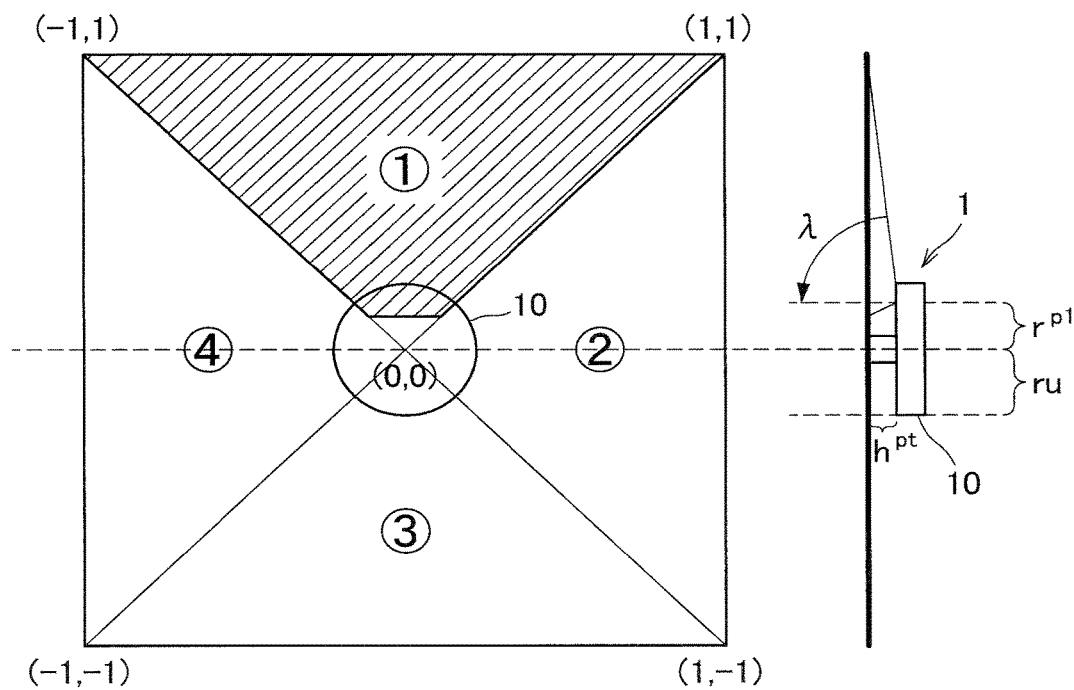
FIG. 14 is an explanatory diagram for describing an example in which a projection is created for the light shade 10.

FIGS. 13 and 14 are each an explanatory diagram for describing another example in which the projection control unit 134 creates a projection for the light shade 10 through the simple positioning. FIG. 13 illustrates a range of an image to be projected by the projector head 50*a* onto the surface of the light shade 10, while FIG. 14 illustrates a range of an image to be projected by each of the projector heads 50*b* to 50*e* onto the whole of the ceiling.

When the original image is depicted on the ceiling with no distortions, the image position of a depiction target part (i.e. square part in FIG. 14) of the original image agrees with the coordinates of the original image depicted on the ceiling. Each projector lens has a projection range of tan $\lambda * h^{pt} + r^{p1}$, where λ represents a horizontal maximum projection angle, $h^{pt}$ represents the distance of the light-integrated projector 1 from the ceiling, and $r^{p1}$ represents the distance of each projector lens of the light-integrated projector 1 for the ceiling from the center of the light-integrated projector 1. An image at the end of the light-integrated projector 1 has coordinates of $1 * ru/(\tan \lambda * h^{pt} + r^{p1})$, where ru represents the radius of the light-integrated projector 1.

The projection control unit 134 thus generates an image for mapping an image having a radius of $ru/(\tan \lambda * h^{pt} + r^{p1})$ to the light shade 10. The projection control unit 134 generates an image for mapping the image having a radius of $ru/(\tan \lambda * h^{pt} + r^{p1})$ to the light shade 10, and then projects the generated image onto the light shade 10, so that the projection control unit 134 can show an image that looks continuous over the ceiling and the light shade 10.

(2) Perspective Positioning

Second processing is a method of making a correction on the basis of the ratio of the distance between the light-integrated projector 1 and the viewing position to the distance (constant) between the light-integrated projector 1 and the ceiling in addition to the simple positioning in (1) because the light-integrated projector 1 looks relatively bigger in perspective.

Compared with the simple positioning in (1), this second processing reduces an image having a wider area, and then maps the reduced image to the light shade 10. An image having a wider area is reduced and mapped to the light shade 10 as compared with the simple positioning, so that there comes about an advantageous effect that the image mapped to the light shade 10 looks continuous with an image mapped to the ceiling as seen from the viewing position.

(3) Dynamic Perspective Positioning

Third processing is a method of, when the distance between the light-integrated projector 1 and the ceiling is variable, making a correction on the basis of the ratio of the distance between the light-integrated projector 1 and the viewing position to the distance (variable) between the light-integrated projector 1 and the ceiling in addition to the perspective positioning in (2) because the light-integrated projector 1 looks relatively bigger in perspective.

In other words, an image to be mapped to the light shade 10 is corrected in this third processing by detecting the distance between the light-integrated projector 1 and the ceiling, which is not identifiable at the time of factory shipment. Additionally, it is possible to detect the distance between the light-integrated projector 1 and the ceiling, for example, by measuring the length of a wire or the like used to hang the light-integrated projector 1 from the ceiling.

Compared with the simple positioning in (1), this third processing also reduces an image having a wider area, and then maps the reduced image to the light shade 10. An image having a wider area is reduced and mapped to the light shade 10 as compared with the simple positioning, so that there comes about an advantageous effect that the image mapped to the light shade 10 looks continuous with an image mapped to the ceiling as seen from the viewing position.

Figure 15:
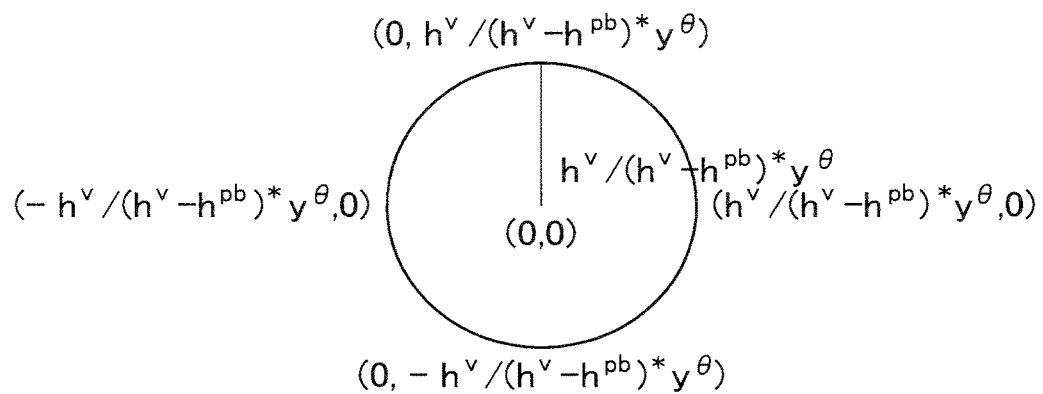
FIG. 15 is an explanatory diagram for describing an example in which a projection is created for the light shade 10.
Figure 16:
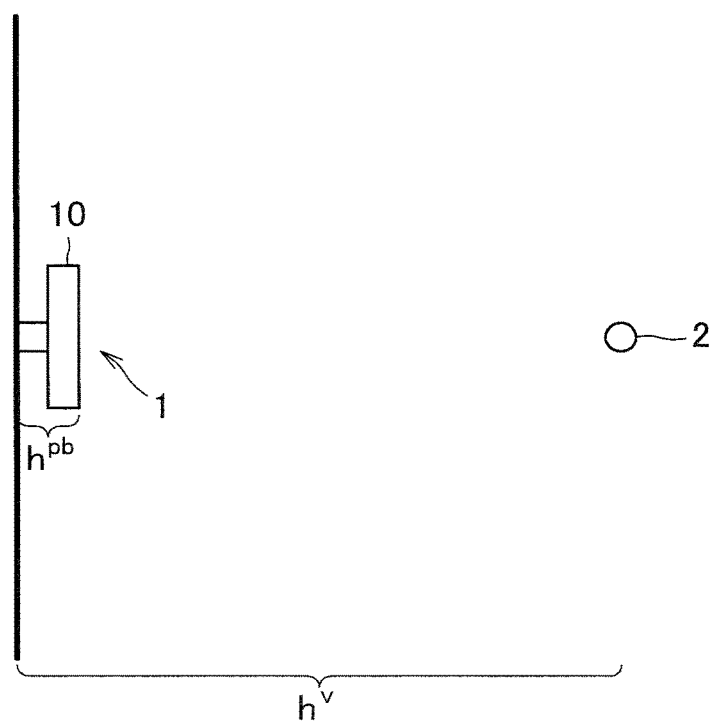
FIG. 16 is an explanatory diagram for describing an example in which a projection is created for the light shade 10.

FIGS. 15 and 16 are each an explanatory diagram for describing an example in which the projection control unit 134 creates a projection for the light shade 10 through the perspective positioning. FIG. 15 illustrates a range of an image to be projected by the projector head 50a onto the surface of the light shade 10, while FIG. 16 illustrates a range of an image to be projected by each of the projector heads 50b to 50e onto the whole of the ceiling.

The perspective positioning in (2) or (3) is based on the simple positioning in (1). An example will be here described with the processing in (1).

To correct the perspective, the projection control unit 134 generates a projection image on the light shade 10 in a manner that an image to be projected onto the light shade 10 has $h^v/(h^v-h^{pb})$ times as wide a range as that of an image in the simple positioning projected, where $h^{pb}$ represents the distance between the projection surface of the light shade 10 and the ceiling, and $h^v$ represents the distance between the viewpoint position 2 and the ceiling. Additionally, the viewpoint position 2 is defined as information that is registered in advance in the control device 100 upon projection onto the ceiling. The distance $h^{pb}$ between the projection surface of the light shade 10 and the ceiling takes not a constant, but a variable in the dynamic perspective positioning in (3).

The projection control unit 134 generates an image having as wide a range to be mapped to the light shade 10 as discussed above, and then projects the generated image onto the light shade 10, so that the projection control unit 134 can show an image that looks continuous over the ceiling and the light shade 10.

(4) Translational Positioning

In addition to the simple positioning in (1), or the perspective positioning in (2) or (3), the amount of the horizontal shift of the content viewing position from the central axis of the light-integrated projector 1 is obtained on the basis of a setting value or a result of the image recognition processing on a captured image of the camera 120, and the position of an image to be mapped to the light shade 10 is translated in fourth processing.

The projection control unit 134 can control the projection of a still image or a picture to make an image to be mapped to the light shade 10 look continuous with an image to be mapped to the ceiling as seen from the viewing position by translating the position of the image to be mapped to the light shade 10 even if the viewing position is shifted from the central axis of the light-integrated projector 1.

Figure 17:
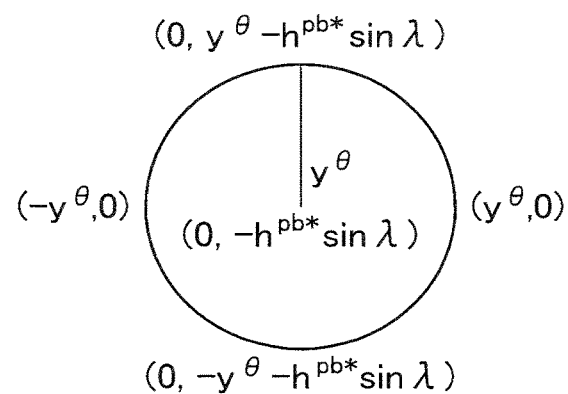
FIG. 17 is an explanatory diagram for describing an example in which a projection is created for the light shade 10.
Figure 18:
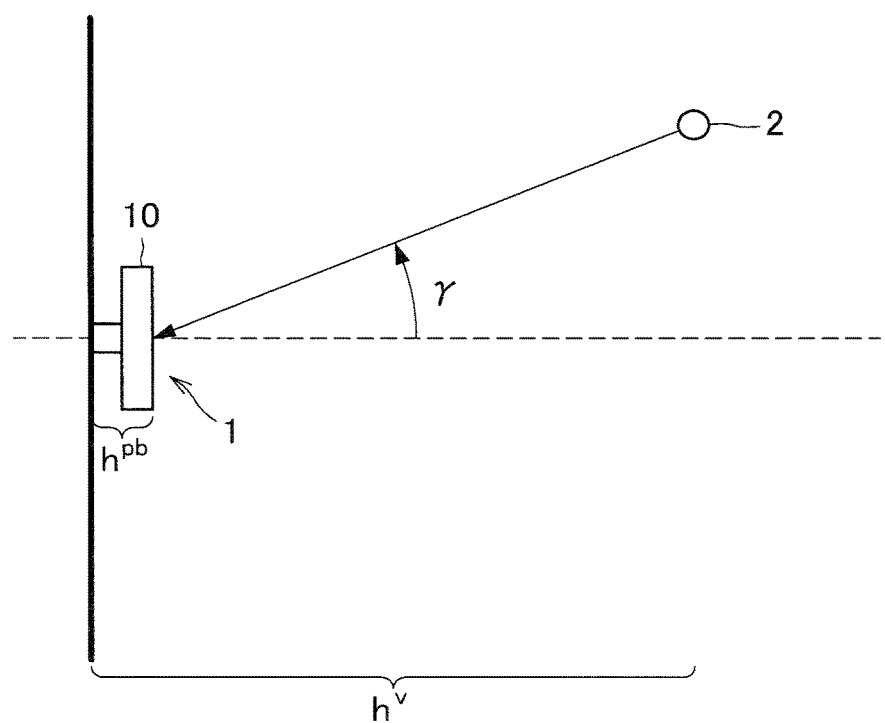
FIG. 18 is an explanatory diagram for describing an example in which a projection is created for the light shade 10.

FIGS. 17 and 18 are each an explanatory diagram for describing an example in which the projection control unit 134 creates a projection for the light shade 10 through the translational positioning. FIG. 17 illustrates a range of an image to be projected by the projector head 50a onto the surface of the light shade 10, while FIG. 18 illustrates a range of an image to be projected by each of the projector heads 50b to 50e onto the whole of the ceiling.

The translational positioning in (4) is based on the simple positioning in (1), or the perspective positioning in (2) or (3). An example will be here described with the processing in (1).

To correct the perspective, the projection control unit 134 generates a projection image for the light shade 10 in a manner that an image to be projected onto the light shade 10 is translated by $h^{pb}*\sin \lambda$ in the minus direction of the y axis, where $h^{pb}$ represents the distance between the projection surface of the light shade 10 and the ceiling, $h^v$ represents the distance between the viewpoint position 2 and the ceiling, and γ represents the angle between the central axis of the light-integrated projector 1 and the line connecting the center of the light-integrated projector 1 to the viewpoint position 2.

When the processing in (2) is used, the projection control unit 134 generates a projection image for the light shade 10 in a manner that an image to be projected onto the light shade 10 has $h^v/(h^v-h^{pb})$ times as wide a range as that of an image in the simple positioning projected, and then the image to be projected onto the light shade 10 is translated by $h^{pb}*\sin \lambda$ in the minus direction of the y axis. The distance $h^{pb}$ between the projection surface of the light shade 10 and the ceiling takes not a constant, but a variable in the dynamic perspective positioning in (3).

Additionally, when there are a plurality of people in the room, the projection control unit 134 does not have to perform this translational processing. It may be determined whether or not there are a plurality of people in the room, for example, on the basis of a captured image of the camera 120 or data from a sensor that is not illustrated. When there are a plurality of people in the room, but they bunch together, the projection control unit 134 may perform the translational processing.

(5) Projection Control Based on Shape of Ceiling

Fifth processing is projection control based on the shape of the ceiling. The flat shape of the ceiling on which the light-integrated projector 1 is placed makes it possible to visually recognize an image projected onto the ceiling from the viewpoint position with no problem, even if the projection control unit 134 generates a projection image for the light shade 10 by the above-described processing.

Meanwhile, if the shape of the ceiling is not flat, it is not possible in some cases to make an image look continuous on the ceiling as seen from below because of the relationship between the projection distance from the light-integrated projector 1 to the ceiling and the viewing distance from the viewpoint position.

Figure 19A:
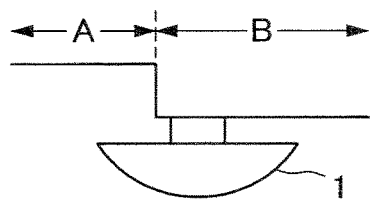
FIG. 19A is an explanatory diagram illustrating an example of an uneven ceiling on which the light-integrated projector 1 is placed.

FIG. 19A is an explanatory diagram illustrating an example of the uneven ceiling on which the light-integrated projector 1 is placed. If the light-integrated projector 1 is placed on the uneven ceiling, which namely means that the shape of the ceiling is not flat as illustrated in FIG. 19A, an image on an A part of the ceiling is viewed larger on the ceiling than an image on a B part as seen from below because of the relationship between the projection distance from the light-integrated projector 1 to the ceiling and the viewing distance from the viewpoint position.

Figure 19B:
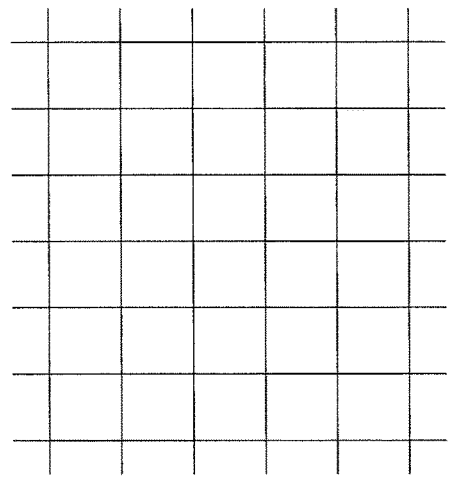
FIG. 19B is an explanatory diagram illustrating an example of an image to be projected by the light-integrated projector 1 onto a ceiling.
Figure 19C:
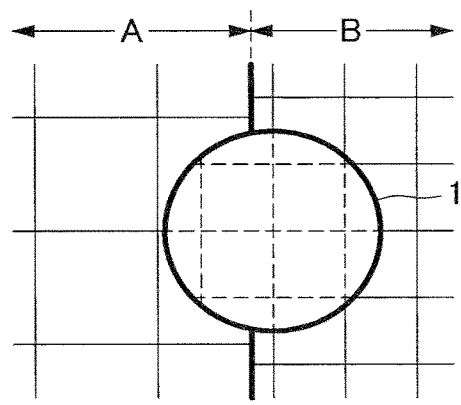
FIG. 19C is an explanatory diagram illustrating an example in which a latticed image as illustrated in FIG. 19B is projected onto the uneven ceiling as illustrated in FIG. 19A, and seen from below.

FIG. 19B is an explanatory diagram illustrating an example of an image to be projected by the light-integrated projector 1 onto the ceiling. FIG. 19C is an explanatory diagram illustrating an example in which a latticed image as illustrated in FIG. 19B is projected onto an uneven ceiling as illustrated in FIG. 19A and seen from below.

Projecting the latticed image as illustrated in FIG. 19B onto the uneven ceiling causes a user who is looking up at the ceiling to visually recognize as if an image on the A part of the ceiling were larger than an image on the B part as illustrated in FIG. 19C.

Accordingly, the projection control unit 134 projects the latticed image as illustrated in FIG. 19B onto the ceiling, and then makes a smartphone, a tablet terminal, a digital still camera, or the like image the ceiling from the viewpoint position. The projection control unit 134 acquires the image captured from the viewpoint position, and analyzes the captured image. The projection control unit 134 then makes the image to be projected onto the A part of the ceiling smaller than the image to be projected onto the B part of the ceiling on the basis of an analysis result of the image.

Figure 19D:
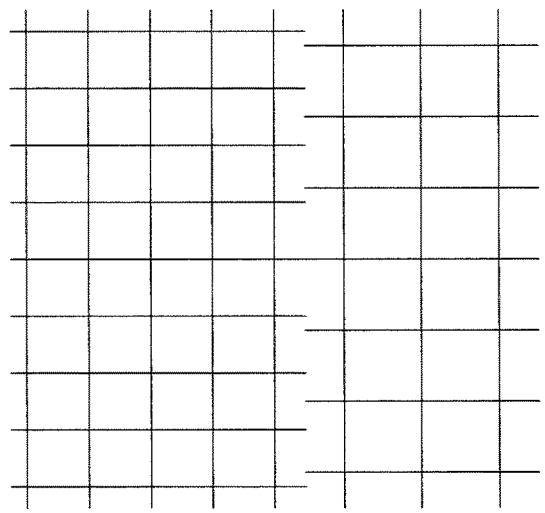
FIG. 19D is an explanatory diagram illustrating an example in which an image to be projected onto an A part illustrated in FIG. 19A is made smaller than an image to be projected onto a B part.
Figure 19E:
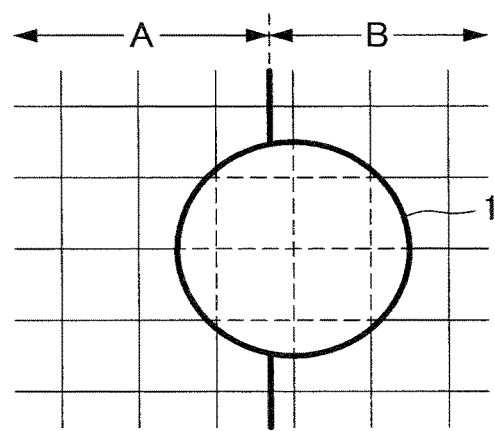
FIG. 19E is an explanatory diagram illustrating an example in which the latticed image as illustrated in FIG. 19D is projected onto the uneven ceiling as illustrated in FIG. 19A, and seen from below.

FIG. 19D is an explanatory diagram illustrating an example in which the projection control unit 134 makes the image to be projected onto the A part of the ceiling smaller than the image to be projected onto the B part of the ceiling on the basis of the analysis result of the image. FIG. 19E is an explanatory diagram illustrating an example in which a latticed image as illustrated in FIG. 19D is projected onto an uneven ceiling as illustrated in FIG. 19A and seen from below.

If the projection control unit 134 makes the image to be projected onto the A part of the ceiling smaller than the image to be projected onto the B part of the ceiling in this way, it is possible to allow a user to visually recognize the image on the A part of the ceiling and the image on the B part in the same size from the viewpoint position as illustrated in FIG. 19E.

(6) Simple Positioning (Image Adjustment for Ceiling)

Sixth processing is a method of projecting the surface of the light-integrated projector 1, which is namely a part continuous with an image projected on the light shade 10, onto the ceiling on the basis of the known distance between the light shade 10 and the ceiling, the known light distribution of the light-integrated projector 1, and the known shape of the light-integrated projector 1.

The processing of the projection control unit 134 to create a projection for the light shade 10 through the simple positioning in (6) will be described in more detail.

Figure 20:
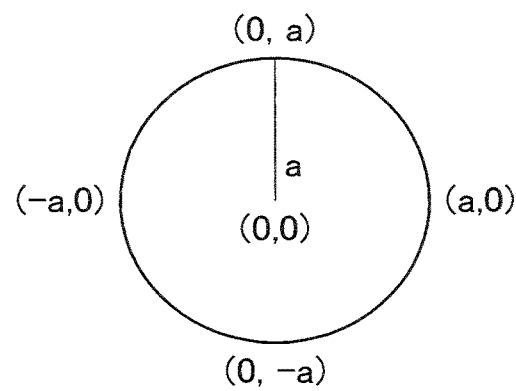
FIG. 20 is an explanatory diagram for describing an example in which a projection is created for the light shade 10.
Figure 21:
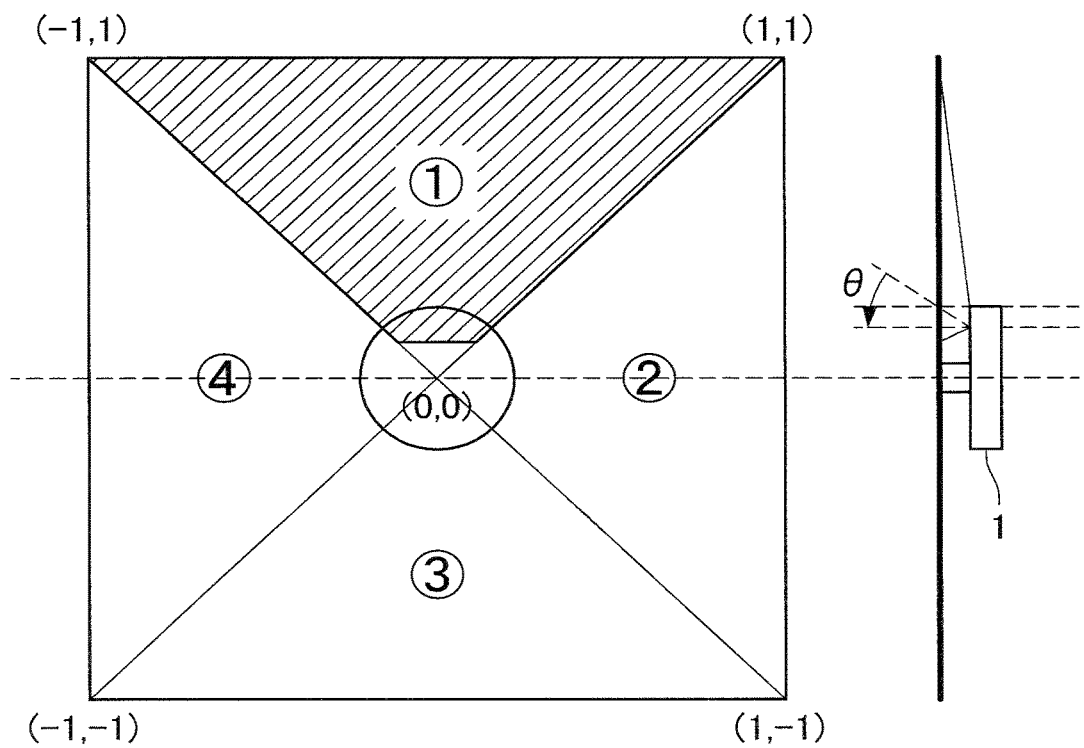
FIG. 21 is an explanatory diagram for describing an example in which a projection is created for the light shade 10.

FIGS. 20 and 21 are each an explanatory diagram for describing an example in which the projection control unit 134 creates a projection for the light shade 10 through the simple positioning. FIG. 20 illustrates a range of an image to be projected by the projector head 50a onto the surface of the light shade 10, while FIG. 21 illustrates a range of an image to be projected by each of the projector heads 50b to 50e onto the whole of the ceiling.

The range of the image to be projected onto the whole of the ceiling is normalized by using the center of the light shade 10 as the origin as illustrated in FIG. 12. The position of an image that forms an angle θ to the lens axis of the projector head as illustrated in FIG. 12 as a result of a combination of projection onto the ceiling through the lens of the projector head, the correction of distortions, and keystone correction is represented as $(0, y^\theta)$. The projection control unit 134 adjusts the enlargement ratio of an image to satisfy $y^\theta = a$ (where a represents the radius of the circle illustrated in FIG. 20).

It is possible to identify y by computing processing or actual measurement. If y is obtained through computing processing, pixels on a liquid crystal panel and an image on the ceiling are formed as a convolution of a lens projection transfer function f, a distortion correction transfer function g, and a keystone transfer function h. The projection control unit 134 obtains y through the deconvolution of f×g×h to the specified position on the ceiling. The projection control unit 134 generates an image for mapping an image having a radius of $y^\theta = a$ to the light shade 10.

The projection control unit 134 thus generates an image having a radius of $y^\theta = a$ which is mapped to the light shade 10. The projection control unit 134 generates an image having a radius of $y^\theta = a$ which is mapped to the light shade 10, and then projects the generated image onto the light shade 10, thereby allowing the image to look continuous over the ceiling and the light shade 10.

(7) Correction of Distortion of Image Due to Curved Projection Surface

When the surface of the light shade 10 is curved, an image is transformed in in seventh processing a manner that the distortion of the image due to the curved light shade 10 is not recognized from the viewing position, but recognized as if the light shade 10 were flat.

Figure 22A:
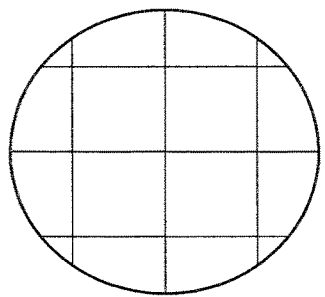
FIG. 22A is an explanatory diagram illustrating an example of an image to be projected onto the light shade 10.
Figure 22B:
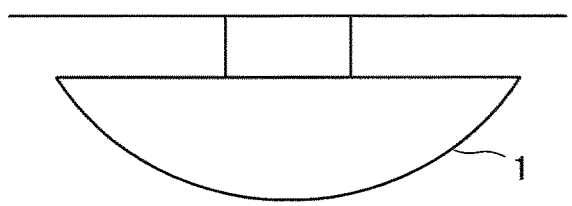
FIG. 22B is an explanatory diagram illustrating an example of a curved surface of the light shade 10 as seen from a side.
Figure 22C:
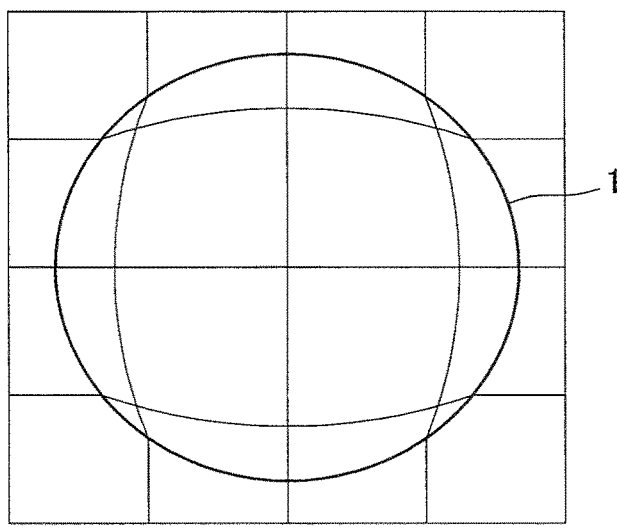
FIG. 22C is an explanatory diagram illustrating that the image as illustrated in FIG. 22A is projected onto the light shade 10 and seen from under the light shade 10.

FIG. 22A is an explanatory diagram illustrating an example of an image to be mapped to the light shade 10. FIG. 22B is an explanatory diagram illustrating an example of the curved surface of the light shade 10 as seen from the side. Once the image as illustrated in FIG. 22A is projected onto the light shade 10 illustrated in FIG. 22B, the image projected onto the light shade 10 is distorted. FIG. 22C is an explanatory diagram illustrating that the image as illustrated in FIG. 22A is projected onto the light shade 10 and seen from under the light shade 10.

Accordingly, when the surface of the light shade 10 is curved, the projection control unit 134 performs image processing of canceling the distortion of the image to be projected on the surface of the light shade 10.

Figure 23A:
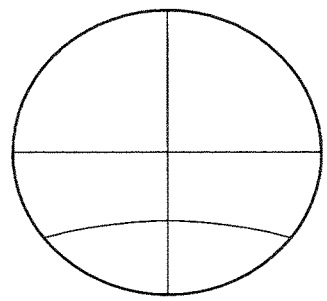
FIG. 23A is an explanatory diagram illustrating an example of an image to be projected onto the light shade 10.
Figure 23B:
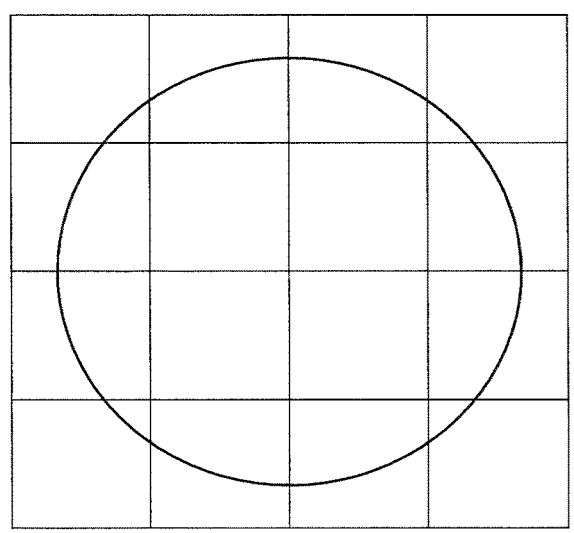
FIG. 23B is an explanatory diagram illustrating that the image as illustrated in FIG. 23A is projected onto the light shade 10 and seen from under the light shade 10.

FIG. 23A is an explanatory diagram illustrating an example of an image to be mapped to the light shade 10, and illustrates an example of an image having a pincushion distortion for canceling the distortion of an image to be projected onto the surface of the light shade 10. FIG. 23B is an explanatory diagram illustrating that the image as illustrated in FIG. 23A is projected onto the light shade 10 and seen from under the light shade 10.

The projection control unit 134 can prevent the image projected onto the light shade 10 from being distorted as illustrated in FIG. 23A, by using a pincushion distortion for canceling the distortion of the image to be projected onto the surface of the light shade 10 as illustrated in FIG. 23B.

Since it is known at the time of the production of the light shade 10 how the surface of the light shade 10 is curved, the projection control unit 134 can provide an image to be projected onto the surface of the light shade 10 with a pincushion distortion in accordance with the extent to which the surface of the light shade 10 is curved. The viewing position of moving image content to be projected may vary the extent to which the image is distorted, so that the control device 100 may have one or more types of distortion correction parameter for each viewing distance at the time of design.

(8) Accentuated Sense of Unity Due to Integrated Luminance, Color Tone, and Texture of Ceiling and Light Shade Eighth processing integrates the luminance, the color tone, and the texture of an image to be projected onto the ceiling with those of an image to be projected onto the light shade 10 on purpose to accentuate the unity of sense. The color and the texture of the light shade 10 are decided at the time of production, so that they are known. The projection control unit 134 can thus integrate the luminance, the color tone such as the color and the color temperature, and the texture of an image to be projected onto the ceiling with those of an image to be projected onto the light shade 10 by detecting a difference between the image to be projected onto the ceiling and the image to be projected onto the light shade 10.

The projection control unit 134 measures the luminance, the color tone, and the texture of the image projected on the ceiling, adjusts the luminance and the color tone of the image to be projected onto the light shade 10, and adds the texture thereof as necessary, for example, on the basis of an image captured by the camera 120. The projection control unit 134 can bring out an expected advantageous effect of enhancing the continuity of the image to be projected onto the ceiling with the image to be projected onto the light shade 10 by adjusting the luminance and the color tone of the image to be projected onto the light shade 10 and adding the texture thereof as necessary.

The projection control unit 134 can also bring out an expected advantageous effect of enhancing the continuity of the image to be projected onto the ceiling with the image to be projected onto the light shade 10 by measuring the luminance, the color tone, and the texture of the image projected on the ceiling, adjusting the luminance and the color tone of the image to be projected onto the ceiling and adding the texture thereof as necessary, for example, on the basis of an image captured by the camera 120.

Figure 24:
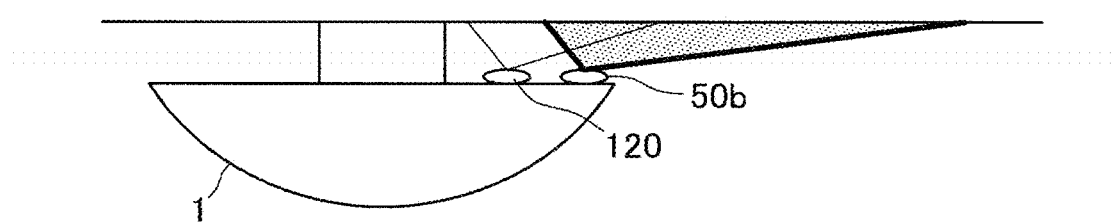
FIG. 24 is an explanatory diagram illustrating an example of the light-integrated projector 1 placed on a ceiling as seen from a side.

FIG. 24 is an explanatory diagram illustrating an example of the light-integrated projector 1 placed on the ceiling as seen from the side. The camera 120 that images the ceiling images the ceiling on which the projector head 50*b* is projecting an image as illustrated in FIG. 24. The projection control unit 134 measures the luminance, the color tone, and the texture of the image projected by the projector head 50*b* on the ceiling, adjusts the luminance and the color tone of the image to be projected onto the light shade 10 or the image to be projected onto the ceiling, and adds the texture thereof as necessary on the basis of the image captured by the camera 120. The projection control unit 134 brings out an advantageous effect of enhancing the continuity of the image to be projected onto the ceiling with the image to be projected onto the light shade 10 by adjusting a projection image with the image captured by the camera 120.

2. Conclusion

According to the embodiment of the present disclosure as described above, the light-integrated projector 1 is provided that is placed on the ceiling and capable of projecting an image onto the ceiling, the light-integrated projector 1 projecting an image also onto the light shade 10.

When generating an image to be projected onto the light shade 10, the light-integrated projector 1 identifies an area of the image projected on the ceiling that is hidden by the light shade 10 from the viewpoint position of a user. The light-integrated projector 1 generates an image to be projected onto the ceiling and an image to be projected onto the light shade 10 on the basis of the identified area.

The light-integrated projector 1 can show an image that looks continuous over the ceiling and the light shade 10 to a user who is looking up at the ceiling, by projecting the images onto the ceiling and the light shade 10.

It is also possible to fabricate a computer program for causing hardware such as the CPU, ROM, and RAM built in each device to implement the same functions as those of the structural elements of each device. It is also possible to provide a storage medium having the computer program stored therein. The respective functional blocks described in the functional block diagram are configured with hardware or a hardware circuit, thereby allowing the series of processing to be implemented by the hardware or the hardware circuit.

A part or all of the functional blocks illustrated in the functional block diagrams used for the description may be implemented by a server device connected via a network such as the Internet. The functional blocks illustrated in the functional block diagrams used for the description may be configured by a single device or a system in which a plurality of devices cooperate with each other. Examples of the system in which a plurality of devices cooperate with each other may include a combination of server devices, and a combination of a server device with a terminal device.

Software for implementing the user interface and the application mentioned in the above-described embodiment may be implemented as a web application used via a network such as the Internet. The web application may be implemented, for example, in a markup language such HyperText Markup Language (HTML), Standard Generalized Markup Language (SGML), and Extensible Markup Language (XML).

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above-described embodiment exemplifies the circular light shade 10 as seen from below, but the embodiment of the present disclosure is not limited to such an example. The light shade can have any shape. The projection control unit 134 can, needless to say, generate an image to be projected onto the light shade in accordance with the shape of the light shade.

The advantageous effects described herein are merely explanatory or illustrative, but not limitary. In other words, the technology according to an embodiment the present disclosure may attain other advantageous effects obvious to those skilled in the art from the present specification in combination with the above-described advantageous effects or instead thereof.

Additionally, the present technology may also be configured as below.

(1) A display control device including:

a display control unit configured to perform control to display a second image based on image information on a surface of a projection device that projects a first image based on the image information onto a predetermined surface, wherein the first image and the second image correspond to different ranges of a single image that is reproduced from the image information.

(2) The display control device according to (1), wherein the display control unit uses information on an area of the first image which is identified by an identification unit and visual recognition of which from a predetermined position is obstructed by the projection device to generate the second image on the basis of the identified area.

(3) The display control device according to (2), wherein the display control unit adjusts a characteristic of the first image or the second image, on the basis of a condition of the first image that has been projected onto the predetermined surface, in a manner that a state in which the first image is displayed substantially agrees with a state in which the second image is displayed.

(4) The display control device according to (3), wherein the display control unit adjusts luminance or color of the first image or the second image, on the basis of a condition of the first image that has been projected onto the predetermined surface, in a manner that at least one of luminance and color of the first image substantially agrees with the one of luminance and color of the second image as a state in which the first image and the second image have been displayed.

(5) The display control device according to (3), wherein the display control unit adds a pattern to the first image or the second image, on the basis of a condition of the first image that has been projected onto the predetermined surface, in a manner that a pattern of the first image agrees with a pattern of the second image as a state in which the first image and the second image have been displayed.

(6) The display control device according to any one of (2) to (5), wherein the display control unit identifies the area on the basis of a distance between the predetermined surface and the projection device, and a shape of the projection device.

(7) The display control device according to any one of (2) to (6), wherein the display control unit further identifies the area on the basis of a distance between the predetermined surface and the predetermined position.

(8) The display control device according to any one of (2) to (7), wherein the display control unit further identifies the area on the basis of an amount of shift between an axis between the predetermined surface and a center of the projection device, and the predetermined position.

(9) The display control device according to any one of (2) to (8), wherein the display control unit identifies the area only when one person alone is detected.

(10) The display control device according to any one of (2) to (9), wherein the display control unit transforms the second image on the basis of a shape of the projection device.

(11) The display control device according to any one of (2) to (10), wherein the display control unit transforms the second image to cancel transformation of the second image projected onto the projection device.

(12) The display control device according to any one of (2) to (11), wherein the display control unit transforms the first image on the basis of a shape of the predetermined surface.

(13) The display control device according to any one of (2) to (12), wherein the display control unit reduces the second image in accordance with content of the first image included in the area.

(14) The display control device according to (13), wherein the display control unit reduces the second image when the first image included in the area includes letter information.

(15) The display control device according to (14), wherein the display control unit analyzes the first image included in the area to determine whether or not the letter information exists.

(16) The display control device according to (14), wherein the display control unit determines whether or not the letter information exists, on the basis of metadata attached to the first image.

(17) The display control device according to any one of (2) to (16), wherein the projection device includes a light shade.

(18) The display control device according to any one of (2) to (17), wherein the predetermined surface includes a ceiling of a room.

(19) A display control method including:
displaying a second image based on image information on a surface of a projection device that projects a first image based on the image information onto a predetermined surface,
wherein the first image and the second image correspond to different ranges of a single image that is reproduced from the image information.

(20) A non-transitory computer-readable storage medium having a computer program stored therein, the computer program including instruction information that causes a computer to execute:
processing of displaying second image based on image information on a surface of a projection device that projects a first image based on the image information onto a predetermined surface,
wherein the first image and the second image correspond to different ranges of a single image that is reproduced from the image information.

What is claimed is:

1. A display control device to be attached to a wall, the display control device comprising:
a light shade;
a first projection device configured to project a first image onto the wall to which the display control device is attached;
a second projection device configured to project a second image onto a surface of the light shade, the second projection device being covered by the light shade; and
circuitry configured to divide a single image into the first image to be projected onto the wall and the second image to be projected onto the surface of the light shade such that the first image projected onto the wall and the second image projected onto the light shade look continuous for a viewer viewing the wall,
wherein the first image and the second image correspond to different ranges of the single image.

2. The display control device according to claim 1, wherein the circuitry uses information on an area of the first image which is identified by the circuitry and visual recognition of which from a predetermined position is obstructed by the display control device to generate the second image on the basis of the identified area.

3. The display control device according to claim 2, wherein the circuitry adjusts a characteristic of the first image or the second image, on the basis of a condition of the first image that has been projected onto the wall, in a manner that a state in which the first image is displayed substantially agrees with a state in which the second image is displayed.

4. The display control device according to claim 3, wherein the circuitry adjusts luminance or color of the first image or the second image, on the basis of a condition of the first image that has been projected onto the wall, in a manner that at least one of luminance and color of the first image substantially agrees with the one of luminance and color of the second image as a state in which the first image and the second image have been displayed.

5. The display control device according to claim 3, wherein the circuitry adds a pattern to the first image or the second image, on the basis of a condition of the first image that has been projected onto the wall, in a manner that a pattern of the first image agrees with a pattern of the second image as a state in which the first image and the second image have been displayed.

6. The display control device according to claim 2, wherein the circuitry identifies the area on the basis of a distance between the wall and the projection device, and a shape of the projection device.

7. The display control device according to claim 6, wherein the circuitry further identifies the area on the basis of a distance between the wall and the predetermined position.

8. The display control device according to claim 7, wherein the circuitry further identifies the area on the basis of an amount of shift between an axis between the wall and a center of the projection device, and the predetermined position.

9. The display control device according to claim 8, wherein the circuitry identifies the area only when one person alone is detected as the viewer.

10. The display control device according to claim 2, wherein the circuitry transforms the second image on the basis of a shape of the display control device.

11. The display control device according to claim 10, wherein the circuitry transforms the second image to cancel transformation of the second image projected onto the display control device.

12. The display control device according to claim 2, wherein the circuitry transforms the first image on the basis of a shape of the wall.

13. The display control device according to claim 2, wherein the circuitry reduces the second image in accordance with content of the first image included in the area.

14. The display control device according to claim 13, wherein the circuitry reduces the second image when the first image included in the area includes letter information.

15. The display control device according to claim 14, wherein the circuitry analyzes the first image included in the area to determine whether or not the letter information exists.

16. The display control device according to claim 14, wherein the circuitry determines whether or not the letter information exists, on the basis of metadata attached to the first image.

17. The display control device according to claim 1, wherein the wall has a planar surface, and the light shade has a non-planar surface.

18. The display control device according to claim 1, wherein the light shade is not provided in a same plane as the wall.

19. A display control method for a display control device to be attached to a wall, the method comprising:
    projecting, using a first projecting device, a first image onto the wall to which the display control device is attached, the display control device including the first projecting device, a second projection device covered by a light shade, and circuitry;
    projecting, using the second projecting device, a second image onto a surface of the light shade; and
    dividing, using the circuitry, a single image into the first image to be projected onto the wall and the second image to be projected onto the surface of the light shade such that the first image projected onto the wall and the second image projected onto the light shade look continuous for a viewer viewing the wall,
    wherein the first image and the second image correspond to different ranges of the single image.

20. A non-transitory computer-readable storage medium having a computer program stored therein, the computer program including instruction information that causes a computer to execute a display control method for a display control device to be attached to a wall, the method comprising:
    projecting, using a first projecting device, a first image onto the wall to which the display control device is attached, the display control device including the first projecting device, a second projection device covered by a light shade, and circuitry;
    projecting, using the second projecting device, a second image onto a surface of the light shade; and
    dividing, using the circuitry, a single image into the first image to be projected onto the wall and the second image to be projected onto the surface of the light shade such that the first image projected onto the wall and the second image projected onto the light shade look continuous for a viewer viewing the wall,
    wherein the first image and the second image correspond to different ranges of the single image.

* * * * *